Sept. 6, 1932.　　　　W. JOSSELYN　　　　1,876,143
CAMERA
Original Filed April 17, 1929
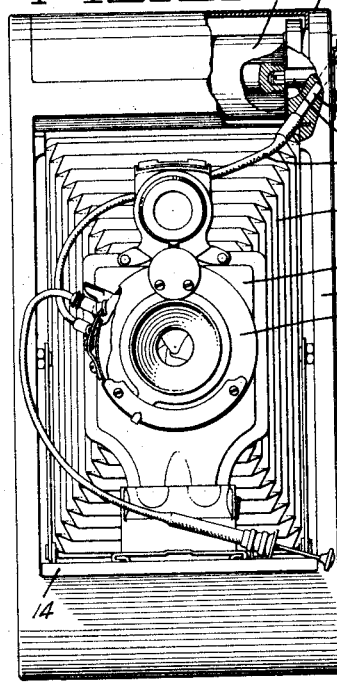
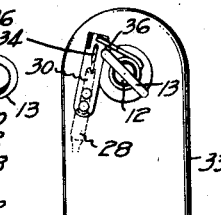
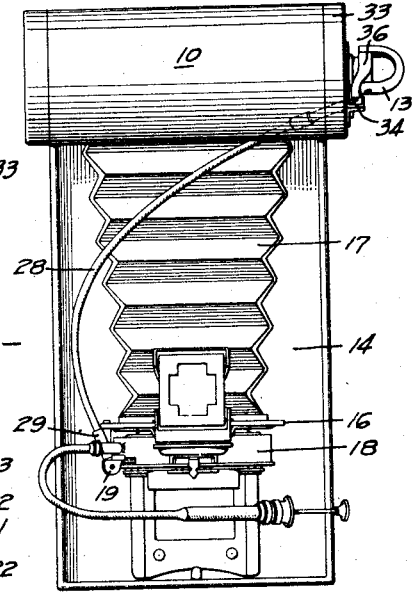
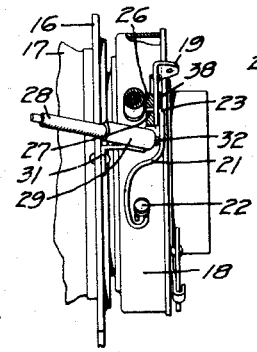
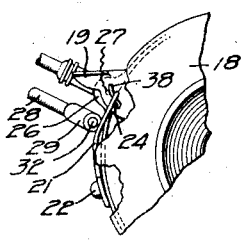
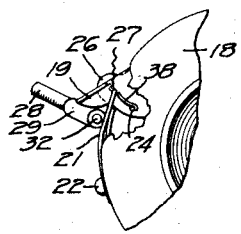
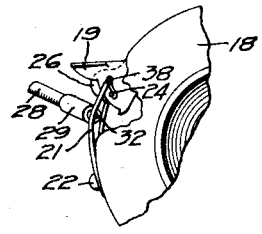
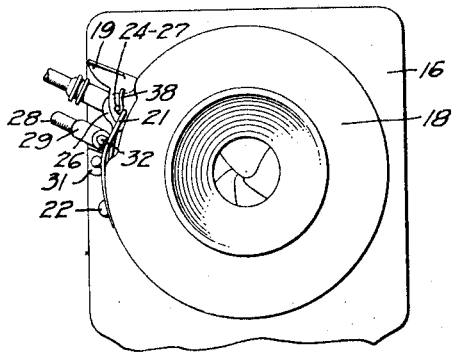
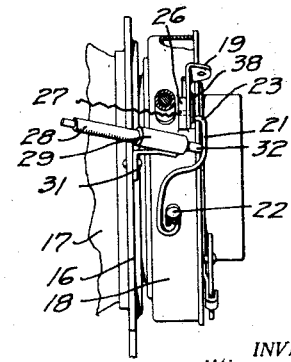
INVENTOR
Winsor Josselyn
BY
White, Prost Fryer
ATTORNEYS Patented Sept. 6, 1932

1,876,143

UNITED STATES PATENT OFFICE

WINSOR JOSSELYN, OF CARMEL, CALIFORNIA

CAMERA

Application filed April 17, 1929, Serial No. 355,879. Renewed April 5, 1932.

This invention relates generally to the construction of cameras, and particularly cameras of the portable type used by the general public in taking snap-shots or time exposures.

It is a general object of this invention to devise means in conjunction with a camera for positively preventing the taking of double film exposures.

It is a further object of this invention to devise means for automatically locking the shutter mechanism of a camera after the taking of an exposure, and to provide means for automatically releasing the locking means when an unexposed portion of the film has moved to take the place of the exposed portion.

It is a further object of this invention to devise novel means for releasably locking the shutter mechanism of a camera after taking each exposure, and which when released will permit only one complete shutter operation to occur.

It is a further object of this invention to devise apparatus of the above character which incorporates a novel motion applying connection between the film holder and the shutter mechanism.

It is a further object of this invention to devise positive means for preventing taking of double exposures, which can be readily incorporated with portable cameras of standard construction.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a front view of a camera incorporating my invention.

Fig. 2 is a plan view of the camera shown in Fig. 1.

Fig. 3 is a detail illustrating parts mounted upon the film holder and which are operated when an unexposed film portion is moved to take the place of an exposed portion.

Fig. 4 is a detail illustrating the preferred form of my releasable locking mechanism and its association with the camera shutter.

Fig. 5 is a front view of my locking mechanism and the associated camera shutter, showing the locking mechanism in released position.

Fig. 6 is a side elevational detail of the structure as shown in Fig. 5.

Figs. 7, 8 and 9, are detail views illustrating the mode of operation of my locking means for different positions of the shutter operating lever.

In the operation of cameras using the common film roll, it is a frequent occurrence for the operator to forget to move an unexposed film portion into position to take the place of an exposed portion, after the taking of each picture, with the result that a double exposure is made upon one portion of the film. In order to minimize the danger of a double exposure, it has previously been proposed to utilize means for indicating that an exposure has been made. However such devices merely serve as a reminder of the fact that one exposure has been made upon a given film portion, and do not positively preclude a double exposure in case the indication is ignored by the operator. In my invention I provide means for effectively locking the shutter after the taking of each picture, and this locking means is released automatically when the film is moved to bring an unexposed portion into place for taking a new exposure.

In the drawing I have illustrated my invention incorporated with a common form of portable camera consisting of a body 10 serving as a holder for a film strip. I prefer that this camera be of such a type that the film strip is unrolled from a spool or roll positioned within one end of body 10, and is wound up upon another spool 11 positioned in the other end of body 10, as the film is exposed. For turning spool 11 I have shown the usual rotatable spindle 12, which has a ring 13 or other suitable means secured to its outer end for convenient manual engagement. With a camera of this type, after each exposure it is necessary for the operator to turn spindle 12 to roll up the exposed film portion.

The front of film holder 10 is provided with the usual hinged door 14, which when opened to the position shown in Figs. 1 and 2, serves as a support and guide for the shutter and lens mounting 16. Mounting 16 is connected to the film holder 10 by means of a bellows 17, this bellows together with the film holder 10 serving to enclose the camera dark space. The shutter and lens mounting 16 is adjustable with respect to the holder 10, in order to focus the camera for taking pictures at different distances.

The shutter mechanism has been shown enclosed within casing 18, which is carried by mounting 16. Various shutter mechanisms are utilized in cameras of this type, but in all instances the mechanism utilizes at least one member which undergoes certain predetermined movements for making possible one complete shutter operation. Lever 19 extending from the shutter casing 18, is a member of this character. In making an exposure, an operator depresses lever 19 from a normal initial position to a lowered position in which the shutter mechanism is operated, after which lever 19 returns to its normal position under spring pressure.

As means for locking lever 19 each time it returns to normal position, I have shown suitable means consisting in this instance of a resilient spring latch 21, suitably mounted upon the shutter casing 18, as by means of screw 22. Latch 21 is provided with a laterally bent end portion 23, adapted to engage in an aperture 24 provided in lever 19. The positioning of latch 21 is such that locking engagement can only occur when lever 19 is in its raised or initial position, and the resilient character of the latch is such that it is always normally urged toward engaged position. In order to relieve latch 21 from stresses which might be applied to the same when in locked position, I preferably provide a lug 26 immediately behind lever 19, which has a recess or aperture 27. When lever 19 is in its initial or raised position, apertures 24 and 27 are in registry, and portion 23 when in locked position extends thru both apertures.

In order to effect automatic release of latch 21, I provide a mechanical connection between this latch and the rotatable spindle 12. The particular mechanical connection shown has many desirable features and includes a flexible motion transmitting device 28. Devices of this kind are commonly utilized on cameras for transmitting motion to the shutter mechanism, and generally consist of an outer flexible casing enclosing a slidable flexible thrust transmitting member. Adjacent the latch 21, the stationary sleeve 29 of device 28 is suitably secured to the mounting 16, as by means of bracket 31. The slidable thrust transmitting pin 32 extending from sleeve 29, is arranged to engage the inner side of latch 21. Adjacent the spindle 12, the stationary sleeve 30 of device 28 is fixed within the side wall 33 of film holder 10. The slidable actuating pin 34 extending from sleeve 30, is adapted to be engaged and actuated by an arm 36 which is fixed to and extends laterally from spindle 12. I prefer that sleeve 30 and pin 34 extend at an angle of somewhat less than 90 degrees with respect to the axis of spindle 12, so that upon rotation of spindle 12 in a counterclockwise direction as shown in Fig. 3, this pin is forced into sleeve 30, and then the end of the pin escapes from the lower edge of arm 36. The arrangement of pin 34 with arm 36 forms in effect cam means for securing actuation of pin 34. In order to apply the thrust more directly to pin 34 and to reduce the torque required upon spindle 12 while pin 34 is being depressed, I have shown the outer end of arm 36 twisted, so that the surface which engages pin 34 is inclined with respect to the axis of spindle 12. To prevent accidental engagement with pin 34 I preferably provide a fixed guard which overlies the end of the pin but which does not interfere with movement of arm 36.

When pin 34 is actuated by rotation of spindle 12, pin 32 adjacent the latch 21 is forced outwardly a corresponding amount, to withdraw the latch from its locking engagement with lever 19. In order to provide means for retaining the latch in unlocked condition before the lever 19 is operated, I have shown a ridge 38 formed upon the front face of lever 19. The lower end of this ridge extends down along one side of aperture 24. It will be noted from Fig. 2, that sleeve 29 and pin 32 are inclined with respect to the axis of pivotal movement of lever 19. Therefore when movement of thrust pin 32 disengages latch 21, it simultaneously shifts the position of this latch laterally with respect to aperture 24, so that when the latch is again permitted to contact with the face of lever 19 upon relieving the force upon thrust pin 32, end portion 23 is on the right side of ridge 38 as shown in Fig. 5. Any further movements of thrust pin 32, due to further repeated rotation of spindle 12, cannot remove latch 21 from this disengaged position, so that the latch cannot again be placed in locked position until the shutter has been operated, as will be presently explained.

Assuming that the latch is in disengaged position as shown in Fig. 5, and that an unexposed film portion has been moved in position for taking a picture, the operator is free to depress lever 19 and operate the shutter at any time. When the lever 19 is fully depressed, the shutter is released and the lever 19 and latch 21 have the relative positions shown in Fig. 8. It will be noted that at this time the portion 23 of latch 21 has cleared the upper end of ridge 38 so that it is free to spring back upon the left side of this ridge. Upon release of lever 19 and as this lever returns to its initial position, latch 21 is guided along the left side of ridge 38 as shown in Fig. 9, until lever 19 has completely returned to its initial position, at which time portion 23 snaps into locking engagement with apertures 24 and 27. Lever 19 is now locked in its initial position, and it is impossible to take another exposure, until the operator has turned spindle 12 to replace the exposed film portion with another unexposed portion. It is apparent that equivalent cam guiding means can be substituted for ridge 38, to properly guide and position the latch.

In certain types of shutter mechanisms, as for example shutters of the character shown, lever 19 is depressed twice for taking time exposures. After the first depression of lever 19 to open the shutter, this lever does not return completely to its initial position, until again depressed to close the shutter. While in such intermediate position, it is impossible for latch 21 to again engage apertures 24 and 27 because of the extent of ridge 38, so that the shutter will not be locked until the time exposure is completed. During handling of the camera it is possible that an operator may accidentally depress lever 19 a certain amount, without actually causing release of the shutter. In such event the shutter will not become locked, because the extent of ridge 38 makes it necessary to fully depress lever 19 to release the shutter, before the latch can again lock the shutter.

It is evident that my invention incorporates many novel features in addition to positively preventing taking of double exposures. The flexible nature of device 28 makes it possible to fold up the camera without disrupting any mechanical connections. In fact it is possible to effect release of the shutter mechanism after the camera has been folded. Incorporating my invention with a camera is also simplified by virtue of the fact that the flexible device 28 is entirely out-side the bellows 17 and the dark space of the camera. The invention can either be incorporated as an attachment for a camera, or can be incorporated as an inherent part of the camera design. By making slight alterations, the invention can be incorporated with the shutter mechanism of any camera. For example it can be applied to a shutter having one lever which is moved to tension the shutter and another lever to effect release. In such case the latch can be arranged to lock the shutter tensioning lever each time this lever returns to normal position. Not only is the construction of extreme simplicity, but its operation is entirely automatic and requires no further operating movements than are necessary for the operation of the ordinary camera.

I claim:
1. In a camera, a film winding reel, a shutter, a lever operable to control actuation of said shutter, resilient means for engaging and locking said lever against movement after each actuation of said shutter, releasing means actuated by turning movement of said film winding reel operative to release said resilient means from locking engagement with said lever, and a ridge on said lever for guiding the operation of said resilient means.

2. In a camera, a film winding reel, a shutter, a lever movable from one position to a second position to control the actuation of said shutter, a catch on said lever, resilient means cooperating with said catch for engaging and locking said lever in said first position after movement to said second position, releasing means actuated in response to turning movement of said film winding reel operative to release said resilient means from locking engagement with said lever, and means on said lever for guiding said resilient means into and out of engagement with said catch.

3. In a camera, a film winding reel, a shutter, a lever movable from one position to a second position to control the actuation of said shutter, said lever being provided with an aperture, a spring having a finger adapted to project into said aperture when said lever is in said first position, and a stationary lug disposed adjacent said lever, said lug having an aperture adapted to register with the aperture in said lever when said lever is in said first position, whereby said finger also projects into the aperture in said lug.

4. In a camera, a film winding reel, a shutter, a lever movable from one position to a second position to control the actuation of said shutter, said lever being provided with an aperture, a spring having a finger adapted to project into said aperture when said lever is in said first position, a stationary lug disposed adjacent said lever, said lug having an aperture adapted to register with the aperture in said lever when said lever is in said first position, whereby said finger also projects into the aperture in said lug, and means actuated by a turning movement of said winding reel operative to remove said finger out of engagement with said apertures.

5. In a camera, a film winding reel, a shutter, a lever movable from one position to a second position to control the actuation of said shutter, said lever being provided with an aperture, a spring having a finger adapted to project into said aperture when said lever is in said first position, and a stationary lug disposed adjacent said lever, said lug having an aperture adapted to register with the aperture in said lever when said lever is in said first position, whereby said finger also projects into the aperture in said lug, means actuated by a turning movement of said winding reel operative to remove said finger out of engagement with said apertures, and a ridge on said lever for guiding said finger into and out of engagement with the aperture on said lever.

In testimony whereof, I have hereunto set my hand.

WINSOR JOSSELYN.